3,517,100
ISOLATION OF NYSTATIN
Joseph Gerald Renella, Tappan, N.Y., assignor to American Cyanamid Company, Stamford, Conn., a corporation of Maine
No Drawing. Filed July 2, 1968, Ser. No. 741,848
Int. Cl. A61k 21/00
U.S. Cl. 424—123                                      5 Claims

ABSTRACT OF THE DISCLOSURE

This disclosure describes a process for recovering highly purified crystalline nystatin from a Streptomyces noursei fermentation mash by adding to the whole harvest mash an aliphatic oxygen-containing organic solvent having a density less than 1.0 and a definite but limited mutual solubility in water, agitating the resulting mixture whereby a nystatin-containing organic solvent-water emulsion upper phase and an aqueous lower phase are formed, separating the nystatin-containing emulsion upper phase and recovering highly purified crystalline nystatin therefrom.

BRIEF SUMMARY OF THE INVENTION

The present invention relates to the antifungal antibiotic nystatin (originally termed fungicidin) and, more particularly, is concerned with an improved process of recovering highly purified crystalline nystatin from a Streptomyces noursei fermentation whole harvest mash. The present invention is based upon the discovery that the addition of an aliphatic oxygen-containing organic solvent having a density less than 1.0 and a definite but limited mutual solubility in water to a Streptomyces noursei fermentation whole harvest mash and agitation of the resulting mixture forms an aqueous lower phase and a nystatin-containing organic solvent-water emulsion upper phase. The nystatin-containing emulsion upper phase may then be readily separated from the aqueous lower phase, the emulsion broken, and highly purified crystalline nystatin recovered therefrom. The invention includes the novel nystatin-containing organic solvent-water emulsion, processes for preparing the novel emulsion, and processes of recovering highly purified crystalline nystatin from Streptomyces noursei fermentation whole harvest mash by means of said novel emulsion.

DETAILED DESCRIPTION OF THE INVENTION

The antibiotic nystatin (fungicidin) and its method of preparation from Streptomyces noursei are described in U.S. Pat. No. 2,797,183 to Hazen et al. See also Hazen et al., "Fungicidin, An Antibiotic Produced by a Soil Antinomycete," Proc. Soc. Exptl. Biol. Med. 76, 93 (1950) and Brown et al., "Effect of Fungicidin (nystatin) in Mice Injected with Lethal Mixtures of Aureomycin and Candida albicans," Science 117, 609 (1953). The antibiotic is referred to hereinafter by the single term "nystatin."

Crude concentrates of nystatin can be prepared by extracting the mycelial mat with several portions of methanol and then processing the methanolic solution by fractional precipitation with ethyl acetate, washing the precipitate with 0.85% sodium chloride solution, redissolving in methanol and fractional precipitation with diethyl ether. See Hazen et al., U.S. Pat. No. 2,797,183, supra. Low yields of active crystalline material can be obtained from the resulting crude concentrates by distribution between n-butanol and saline and by partial precipitation from methanol. Crystalline nystatin of high purity has been obtained by distribution of partially purified nystatin concentrates in a biphasic system made up by mixing n-butanol, methanol, water and hexane and allowing this system to stand exposed to air evaporation until a crop of crystals collects at the interface. Dutcher et al., Antibiotics Annual, 1953–1954, pages 191–194, Medical Encyclopedia, Inc., New York, N.Y.

The recovery of nystatin by isopropanol extraction of the whole broth resulting from the fermentation of the nystatin producing Streptomyces noursei is described in U.S. Pat. No. 2,786,781 to Vandeputte et al. The partially purified product obtained by the Vandeputte et al. process is a therapeutically useful product of about 65–70% purity. At best, however, it is only partially crystalline and for the most part is substantially non-crystalline or amorphous in character. The purification of nystatin employing methanolic-calcium chloride is also described in U.S. Pat. No. 2,832,719 to Vandeputte and in U.S. Pat. No. 2,865,807 to Dutcher et al. The product obtained by the Vandeputte and Dutcher et al. processes is a therapeutically useful highly refined product substantially crystalline in character.

The processes described above produce crystalline nystatin but are objectionable due to the presence of impurities or low yields. They are also objectionable as they are relatively difficult to control and are not of the type desired in large-scale commercial operations.

It is known that pure crystalline nystatin is indicated for certain uses in the antifungal field and attempts have been made to develop improved, simplified processes of obtaining the pure crystalline material in high yield. Attempts in particular have been made to prepare pure crystalline nystatin directly from the relatively crude partially purified plant material obtained by isopropanol extraction of the whole broth by the use of this material in the methanolic-calcium chloride process. In the past, with the processes available, this approach has not been found to be entirely satisfactory or completely successful as the product obtained was seldom uniform and was also frequently contaminated by amorphous material. With continued investigation, I have discovered that highly purified crystalline nystatin may be recovered directly from the whole harvest mash in a single step process which does not involve the prior separation of mycelia. The term "whole harvest mash" refers to the entire medium following a fermentation with Streptomyces noursei and containing, among other things, nystatin, unused fermentation ingredients, fermentation by-products and impurities such as mycelia and other metabolic products. The novel process of the present invention provides a rapid and efficient means of recovering substantially pure nystatin.

The novel process of the present invention comprises adding an organic solvent to the whole harvest mash and agitating the resulting mixture until a nystatin-containing organic solvent-water emulsion upper phase and an aqueous lower phase are formed. The nature of the organic solvent is critical. The organic solvent must be an aliphatic oxygen-containing organic solvent having a density of less than 1.0, preferably from about 0.80 to about 0.90, and in which nystatin is substantially insoluble. It must have a definite but limited solubility in water, that is from about 1.0 to about 25.0 grams per 100 grams of water at 25° C., preferably from about 1.0 to about 10.0 grams per 100 grams of water at 25° C. Some typical organic solvents which form a nystatin-containing emulsion upper phase and are thus operable in the novel process of the present invention are set forth in Table I below:

TABLE I

| Organic solvent | Solubility, g. per 100 g. water at 25°C. | Density at 20° C. |
|---|---|---|
| n-Butanol | 7.2 | 0.81 |
| Sec.-amyl alcohol | 8.2 | 0.81 |
| n-Amyl acetate | 1.8 | 0.86 |
| n-Butyraldehyde | 6.3 | 0.80 |
| n-Butyl acetate | 1.2 | 0.87 |
| Sec.-butanol | 19.0 | 0.81 |
| n-Butyl propionate | 1.2 | 0.87 |
| Iso-butanol | 5.0 | 0.81 |
| Crotonyl alcohol | 15.0 | 0.87 |
| Dimethyl dioxane | 4.3 | 0.92 |
| Ethyl acetate | 7.6 | 0.90 |
| Ethyl formate | 9.2 | 0.91 |
| Iso-propyl acetate | 2.9 | 0.86 |
| Methallyl alcohol | 20.0 | 0.85 |
| Methyl acetate | 24.2 | 0.93 |
| Methylethyl ketone | 23.4 | 0.81 |
| Methylisobutyl ketone | 2.0 | 0.80 |

In general, the amount of organic solvent used is not critical. All that is required is that enough organic solvent be employed so as to saturate the whole harvest mash aqueous phase with a sufficient excess of organic solvent present to form the emulsion phase. A good practice to follow is to add an amount of organic solvent equal to about 20% by volume of the whole harvest mash. After the addition of the organic solvent to the whole harvest mash, the mixture is agitated for a period of time of from about 15 minutes to about an hour or more. The period of agitation is not critical but should be long enough to permit the formation of the emulsion upper phase and to permit the nystatin to collect and remain suspended in the emulsion upper phase. Similarly, the nature of the agitation is not critical and any convenient means such as sparging with air, sonic agitation, and mechanical stirring, may be employed.

It is a surprising aspect of the present invention that the aqueous lower phase contains the spent fermentation ingredients and mycelia as well as other impurities whereas crystalline nystatin is suspended in the emulsion upper phase in highly purified form. The nystatin-containing emulsion upper phase may be separated from the aqueous lower phase by conventional techniques. Perhaps the most convenient method is by centrifugation.

The recovery of high grade crystalline nystatin from the separated emulsion upper phase can be accomplished directly by filtering the suspended nystatin from the emulsion. The emulsion is somewhat difficult to filter, however, since it resembles thin mayonnaise in consistency. A more feasible method of recovery involves the addition of a sufficient amount of a solvent such as methanol or ethanol to break the emulsion and form a continuous phase, thereby permitting the insoluble nystatin to be readily removed by filtration. Alternatively, the water component may be removed from the emulsion by azeotropic distillation and the nystatin may be recovered from the residual organic solvent component by filtration.

The invention will be described in greater detail in conjunction with the following specific examples.

EXAMPLE 1

Isolation of nystatin from crude mash by flotation using n-butanol

A 400 milliliter portion of aqueous whole fermentation mash was stirred with 80 milliliters of n-butanol for 15 minutes. The mixture was centrifuged at low speed causing the solids (nystatin) to collect in the upper (organic solvent) layer. These solids were collected, washed twice with water and then filtered. The partially dry solids were then transferred to an Erlenmeyer flask, chloroform was added and the mixture was stirred for two hours. The solids were filtered and vacuum dried, to give a nystatin product in 71.5% yield, assaying 3815 units per milligram by microbiological analysis.

EXAMPLE 2

Isolation of nystatin from crude mash by flotation using methyl isobutyl ketone

A 400 milliliter portion of aqueous whole fermentation mash, was stirred with 80 milliliters of methyl isobutyl ketone for 15 minutes. The mixture was centrifuged at low speed causing the solids (nystatin) to collect in the upper (organic solvent) layer. These solids were washed twice with water and recentrifuged at a faster rate to collect the nystatin solids. The solids were then partially dried by filtration and then slurried for two hours in chloroform with the aid of about 5 milliliters of n-butanol. The product was then filtered and vacuum dried to give a nystatin product in 85.4% yield, assaying 4020 units per milligram by microbiological analysis.

I claim:
1. The process of isolating highly purified nystatin from a *Streptomyces noursei* fermentation whole harvest mash which comprises adding to the mash an aliphatic oxygen-containing organic solvent in which nystatin is substantially insoluble, said organic solvent having a density of from about 0.80 to about 0.90 at 20° C. and a solubility in water of from about 1.0 to about 25.0 grams per 100 grams of water at 25° C.; agitating the resulting mixture until a nystatin-containing organic solvent-water emulsion upper phase and an aqueous lower phase are formed; separating the emulsion upper phase from the aqueous lower phase; and recovering crystalline nystatin from the emulsion upper phase.

2. A process according to claim 1 wherein the organic solvent is n-butanol and the crystalline nystatin is recovered from the emulsion upper phase by filtering the emulsion.

3. A process according to claim 1 wherein the organic solvent is n-butanol and the crystalline nystatin is recovered from the emulsion upper phase by adding sufficient methanol to the emulsion to break the emulsion and filtering the resulting suspension.

4. A process according to claim 1 wherein the organic solvent is methylisobutyl ketone and the crystalline nystatin is recovered from the emulsion upper phase by filtering the emulsion.

5. A process according to claim 1 wherein the organic solvent is methylisobutyl ketone and the crystalline nystatin is recovered from the emulsion upper phase by adding sufficient ethanol to the emulsion to break the emulsion and filtering the resulting suspension.

References Cited

UNITED STATES PATENTS

| 2,786,781 | 3/1957 | Vandeputte et al. | 424—120 |
| 2,797,183 | 6/1957 | Hazen et al. | 424—120 |
| 3,332,844 | 7/1967 | Vandeputte et al. | 424—120 |

ALBERT T. MEYERS, Primary Examiner

D. M. STEPHENS, Assistant Examiner

U.S. Cl. X.R.

424—120